US012499197B2

(12) United States Patent
Mazumder et al.

(10) Patent No.: US 12,499,197 B2
(45) Date of Patent: Dec. 16, 2025

(54) DEEP FAKE ATTACK PREVENTION FOR VOICE BASED AUTHENTICATION LEVERAGING GENERATIVE ARTIFICIAL INTELLIGENCE (AI) AND DISTRIBUTED LEDGER TECHNOLOGY

(71) Applicant: Bank of America Corporation, Charlotte, NC (US)

(72) Inventors: Shahadat Hossain Mazumder, Charlotte, NC (US); Abhijit Behera, Hyderabad (IN); Maneesh Sethia, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 292 days.

(21) Appl. No.: 18/240,491

(22) Filed: Aug. 31, 2023

(65) Prior Publication Data

US 2025/0077635 A1    Mar. 6, 2025

(51) Int. Cl.
*G06F 21/32* (2013.01)
*G10L 17/06* (2013.01)
*G10L 17/24* (2013.01)

(52) U.S. Cl.
CPC .............. *G06F 21/32* (2013.01); *G10L 17/06* (2013.01); *G10L 17/24* (2013.01)

(58) Field of Classification Search
None
See application file for complete search history.

(56) References Cited

U.S. PATENT DOCUMENTS

| | | | |
|---|---|---|---|
| 9,407,762 B2* | 8/2016 | Keys | H04M 7/003 |
| 10,658,005 B1 | 5/2020 | Bogan, III et al. | |
| 10,671,838 B1 | 6/2020 | Bogan, III et al. | |
| 10,803,646 B1 | 10/2020 | Bogan, III et al. | |
| 10,949,715 B1 | 3/2021 | Berlin et al. | |
| 11,727,721 B2 | 8/2023 | Verma et al. | |
| 2016/0259931 A1* | 9/2016 | Dave | H04L 63/105 |

(Continued)

FOREIGN PATENT DOCUMENTS

| | | |
|---|---|---|
| CA | 3198473 A1 | 4/2022 |
| CN | 114005170 A | 3/2022 |

(Continued)

*Primary Examiner* — Younes Naji
(74) *Attorney, Agent, or Firm* — Banner & Witcoff, Ltd.

(57) ABSTRACT

A computing platform may generate, using a generative AI model, voice based authentication prompts corresponding to a user. Upon receiving a registration request from the user, the computing platform may identify the voice based authentication prompts for the user. The computing platform may send, to a first computing device of the user, the voice based authentication prompts and may receive/store voice based authentication information corresponding to the voice based audio inputs. Based on receiving an access request, the computing platform may send the plurality of voice based authentication prompts, and may receive, from a second computing device, additional voice based audio inputs. The computing platform may score, based on the voice based authentication information, the additional voice based audio inputs. The computing platform may compare the score to a threshold. Based on identifying that the score fails to meet the threshold, the computing platform may initiate security actions.

20 Claims, 11 Drawing Sheets

(56) References Cited

U.S. PATENT DOCUMENTS

| | | | |
|---|---|---|---|
| 2017/0332233 A1* | 11/2017 | Zhang | H04M 15/47 |
| 2018/0082052 A1* | 3/2018 | Swart | G06F 21/32 |
| 2021/0097260 A1 | 4/2021 | Verma et al. | |
| 2021/0097382 A1 | 4/2021 | Mathews et al. | |
| 2021/0233204 A1 | 7/2021 | Alattar et al. | |
| 2021/0319240 A1 | 10/2021 | Demir et al. | |
| 2021/0406568 A1 | 12/2021 | Liberman et al. | |
| 2022/0004904 A1 | 1/2022 | Stemmer et al. | |
| 2022/0036904 A1 | 2/2022 | Traynor et al. | |
| 2022/0121868 A1 | 4/2022 | Chen et al. | |
| 2022/0269922 A1 | 8/2022 | Mathews | |
| 2022/0328050 A1 | 10/2022 | Hennig et al. | |

FOREIGN PATENT DOCUMENTS

| | | |
|---|---|---|
| DE | 102022106057 A1 | 12/2022 |
| EP | 4035406 A1 | 8/2022 |

\* cited by examiner

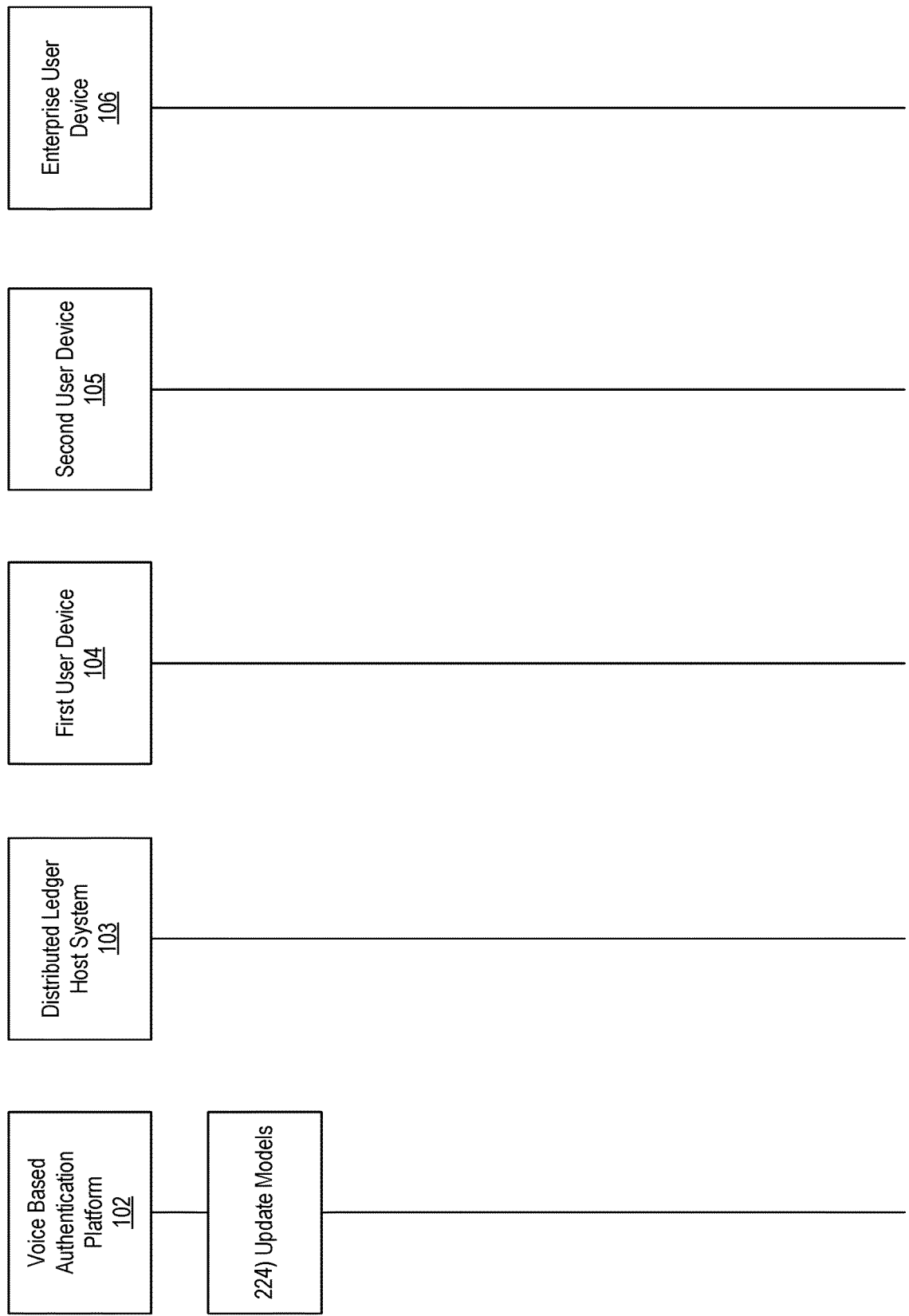

405

**Please Provide Voice Responses to
the Following Questions**

Question #1: <u>Click Here to Provide Response</u>

Question #2: <u>Click Here to Provide Response</u>

Question #3: <u>Click Here to Provide Response</u>

Authentication Interface

Your information has been successfully authenticated!

FIG. 5

DEEP FAKE ATTACK PREVENTION FOR VOICE BASED AUTHENTICATION LEVERAGING GENERATIVE ARTIFICIAL INTELLIGENCE (AI) AND DISTRIBUTED LEDGER TECHNOLOGY

BACKGROUND

In some instances, voice based authentication may be used for chat bots, applications, and/or otherwise to verify user identities. In some instances, however, such voice based authentication may be vulnerable to attacks (e.g., using deep fakes, or the like). For example, deep fakes may be generated that are very similar to a customer's voice, which may allow bad actors to use the deep fakes to satisfy voice authentication measures when logging into an application. Accordingly, as the prevalence of such voice based authentication, and the corresponding use of deep fakes, increases, it may be important to develop a more secure method for voice based authentication.

SUMMARY

Aspects of the disclosure provide effective, efficient, scalable, and convenient technical solutions that address and overcome the technical problems associated with security and authentication. In one or more instances, a computing platform having at least one processor, a communication interface, and memory may generate, using a generative artificial intelligence (AI) model, a plurality of voice based authentication prompts corresponding to a user. Upon receiving a registration request from the user, the computing platform may identify the plurality of voice based authentication prompts for the user. The computing platform may send, to a first computing device of the user, the plurality of voice based authentication prompts and one or more commands directing the first computing device to display the plurality of voice based authentication prompts along with a request for the user to provide a voice based audio input corresponding to each of the plurality of voice based authentication prompts. The computing platform may receive, from the first computing device, voice based authentication information corresponding to the voice based audio inputs. The computing platform may store the voice based authentication information. The computing platform may receive, from a second computing device, an account access request corresponding to the user. The computing platform may send, to the second computing device, the plurality of voice based authentication prompts and one or more commands directing the second computing device to display the plurality of voice based authentication prompts along with a request to provide additional voice based audio inputs corresponding to each of the plurality of voice based authentication prompts. The computing platform may receive, from the second computing device, the additional voice based audio inputs. The computing platform may score, based on the voice based authentication information, the additional voice based audio inputs. The computing platform may compare the score to a predetermined threshold. Based on identifying that the score fails to meet or exceed the predetermined threshold, the computing platform may initiate one or more security actions.

In one or more instances, the computing platform may generate, on behalf of the user, a prompt configured for input into the generative AI model, where the prompt may be generated by inputting information of the user into a trained machine learning model. In one or more instances, generating the plurality of voice based authentication prompts may include inputting, into the generative AI model, the prompt, which may cause the generative AI model to output the plurality of voice based authentication prompts for the user.

In one or more examples, each of the plurality of voice based authentication prompts may be text formatted in a natural language format, and the text may indicate a question to be answered with a speech response. In one or more examples, the computing platform may store, at a distributed ledger, the plurality of voice based authentication prompts, where identifying the plurality of voice based authentication prompts for the user may be based on accessing the distributed ledger.

In one or more instances, the computing platform may update, at a predetermined interval, a plurality of voice based authentication prompts corresponding to a user to produce an updated set of voice based authentication prompts. The computing platform may store, by adding a new entry to the distributed ledger, the updated set of voice based authentication prompts. The computing platform may deactivate flags corresponding to the plurality of voice based authentication prompts. The computing platform may activate flags corresponding to the updated set of voice based authentication prompts.

In one or more examples, identifying the plurality of voice based authentication prompts for the user may include identifying voice based authentication prompts at a distributed ledger with active flags. In one or more examples, storing the voice based authentication information may include storing the voice based authentication information using a distributed ledger.

In one or more instances, scoring the additional voice based audio inputs may include: 1) inputting, into a machine learning model, the additional voice based audio inputs, where the machine learning model may be configured to output the score based on both of: a similarity between speech patterns of the additional voice based audio inputs and speech patterns of the voice based authentication information, and an accuracy of content comprising the additional voice based audio input, as compared to content of the voice based authentication information. In one or more instances, based on identifying that the score fails to meet or exceed the predetermined threshold, the computing platform may grant account access.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for leveraging artificial intelligence and distributed ledger technology to prevent deep fake attacks during voice authentication in accordance with one or more example embodiments;

FIGS. 4-6 depict illustrative user interfaces leveraging artificial intelligence and distributed ledger technology to prevent deep fake attacks during voice authentication in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for leveraging generative artificial intelligence (AI) and distributed ledger technology for deep fake attack prevention and voice based authentication are described herein. For example, voice based authentication may be the future of authentication for many chat bots and banking applications. However, when voice authentication is used, there may be a high chance of fraudulent attacks using deep fakes. For example, deep fakes may generate a similar voice to a customer and login to a banking application (assuming voice authentication is an option for logging into the application). Accordingly, a solution is described herein where voice based authentication implements a generative adversarial network and blockchain.

For example, a recorded voice at the time of registration may be stored in a secured token where the customer needs to say at least one sentence with a different voice note. At the time of login, the customer may need to say the usual login related command and the voice command with different voice notes. Generative AI may display the security questions dynamically for the customer. At the time of login, if there is a chance of fraud or any suspicious activity detected, the intelligent AI enabled system may flash the security question to the customer. The generative AI may have a smart scoring system of voice authentication. If the scoring is less than a certain point, the generative AI may flash the security questions. The security questions may be inside a secured immutable token. Once all the authentication is completed, the user may be allowed to login to the application. In doing so, deep fake related voice attacks may be eliminated.

These and other features are described in greater detail below.

Figure 1A:
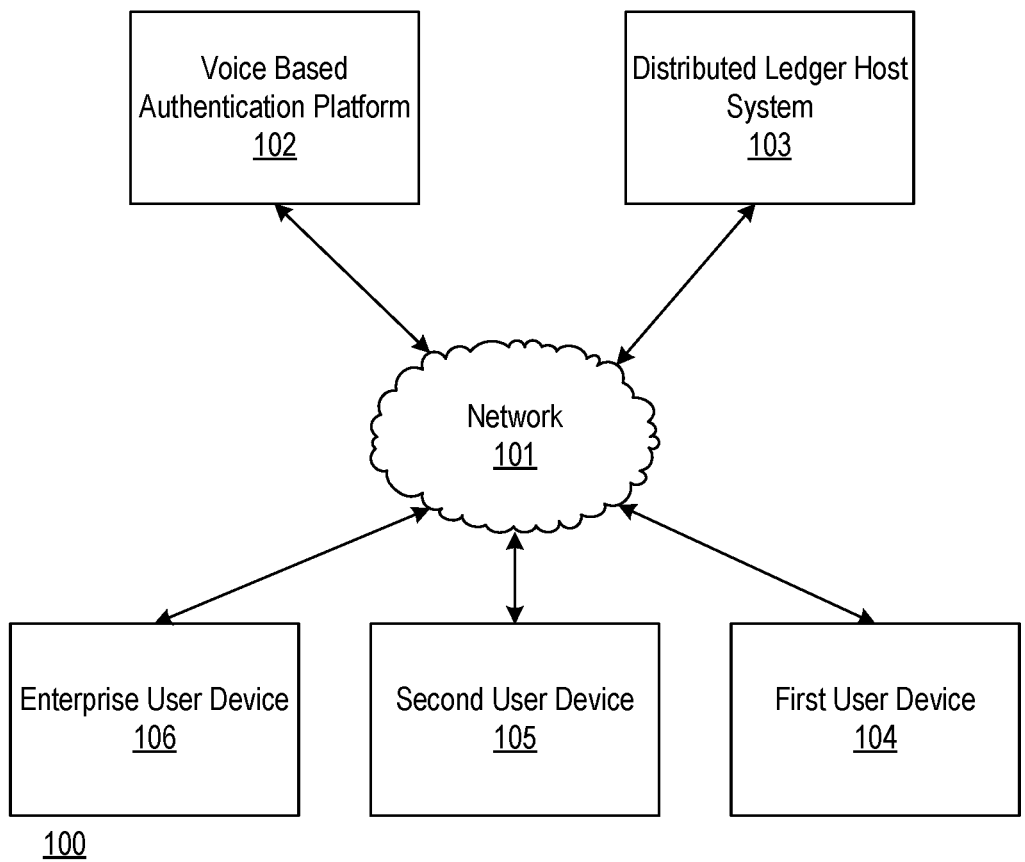
FIGS. 1A-1B depict an illustrative computing environment for leveraging artificial intelligence and distributed ledger technology to prevent deep fake attacks during voice authentication in accordance with one or more example embodiments.
Figure 1B:
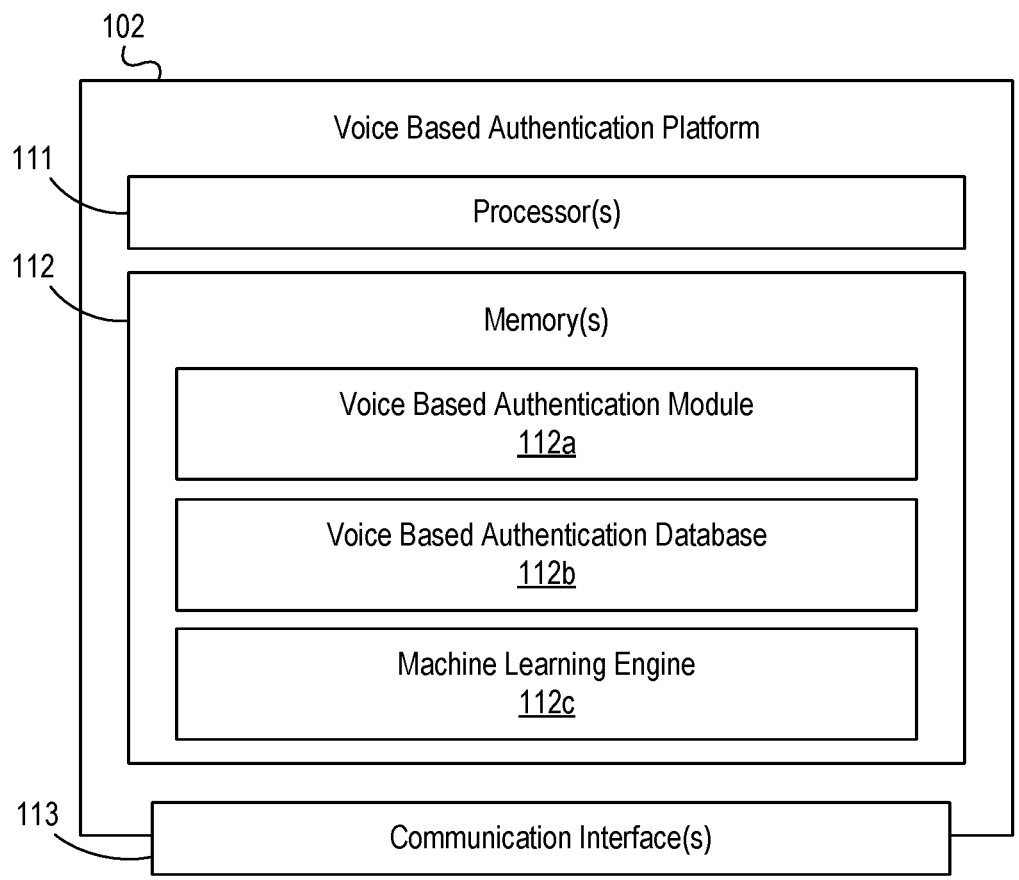

FIGS. 1A-1B depict an illustrative computing environment for leveraging artificial intelligence and distributed ledger technology to prevent deep fake attacks during voice authentication in accordance with one or more example embodiments. Referring to FIG. 1A, computing environment 100 may include one or more computer systems. For example, computing environment 100 may include voice based authentication platform 102, distributed ledger host system 103, first user device 104, second user device 105, and enterprise user device 106.

As described further below, voice based authentication platform 102 may be a computer system that includes one or more computing devices (e.g., servers, server blades, or the like) and/or other computer components (e.g., processors, memories, communication interfaces) that may be used to perform prompt generation for a generative AI model, which may, e.g., be used to generate authentication questions. The voice based authentication platform 102 may further be configured to receive responses to the authentication questions, and score the responses accordingly. Based on the scores, the voice based authentication platform 102 may be configured to facilitate access and/or initiate security actions accordingly.

Distributed ledger host system 103 may be a computer system that includes one or more computing devices (e.g., servers, server blades, or the like) and/or other computer components (e.g., processors, memories, communication interfaces, or the like). In some instances, the distributed ledger host system 103 may host a distributed ledger, which may, e.g., be used to store authentication questions, responses to the authentication questions, and/or other information.

First user device 104 may be and/or otherwise include a laptop computer, desktop computer, mobile device, tablet, smartphone, and/or other device that may be used by an individual (such as a client of an enterprise organization). In some instances, first user device 104 may be used to provide initial authentication information (e.g., during a client registration period with an application, service, or the like), subsequent authentication information (e.g., during a login attempt, or the like), and/or perform other functions. In some instances, first user device 104 may be configured to display one or more user interfaces (e.g., authentication interfaces or the like).

Second user device 105 may be and/or otherwise include a laptop computer, desktop computer, mobile device, tablet, smartphone, and/or other device that may be used by an individual (such as a client of an enterprise organization). In some instances, second user device 105 may be used to provide initial authentication information (e.g., during a client registration period with an application, service, or the like), subsequent information (e.g., during a login attempt, or the like), and/or perform other functions. In some instances, second user device 105 may be configured to display one or more user interfaces (e.g., authentication interfaces or the like). In some instances, the second user device 105 may be operated by the same individual associated with the first user device 104 (e.g., a legitimate user). In other instances, the second user device 105 may be operated by a different individual than the individual associated with the first user device 104 (e.g., may be a bad actor).

Enterprise user device 106 may be and/or otherwise include a laptop computer, desktop computer, mobile device, tablet, smartphone, and/or other device that may be used by an individual (such as an employee, administrator, or the like of an enterprise organization). In some instances, enterprise user device 106 may be configured to display one or more user interfaces (e.g., security notifications, or the like).

Although three user devices are shown, any number of such devices may be deployed in the systems/methods described below without departing from the scope of the disclosure.

Computing environment 100 also may include one or more networks, which may interconnect voice based authentication platform 102, distributed ledger host system 103, first user device 104, second user device 105, enterprise user device 106, or the like. For example, computing environment 100 may include a network 101 (which may interconnect, e.g., voice based authentication platform 102, distributed ledger host system 103, first user device 104, second user device 105, enterprise user device 106, or the like).

In one or more arrangements, voice based authentication platform 102, distributed ledger host system 103, first user device 104, second user device 105, and enterprise user device 106 may be any type of computing device capable of sending and/or receiving requests and processing the requests accordingly. For example, voice based authentication platform 102, distributed ledger host system 103, first user device 104, second user device 105, enterprise user device 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of voice based authentication platform 102, distributed ledger host system 103, first user device 104, second user device 105, and/or enterprise user device 106, may, in some instances, be special-purpose computing devices configured to perform specific functions.

Referring to FIG. 1B, voice based authentication platform 102 may include one or more processors 111, memory 112, and communication interface 113. A data bus may interconnect processor 111, memory 112, and communication interface 113. Communication interface 113 may be a network interface configured to support communication between voice based authentication platform 102 and one or more networks (e.g., network 101, or the like). Memory 112 may include one or more program modules having instructions that when executed by processor 111 cause voice based authentication platform 102 to perform one or more functions described herein and/or one or more databases that may store and/or otherwise maintain information which may be used by such program modules and/or processor 111. In some instances, the one or more program modules and/or databases may be stored by and/or maintained in different memory units of voice based authentication platform 102 and/or by different computing devices that may form and/or otherwise make up voice based authentication platform 102. For example, memory 112 may have, host, store, and/or include voice based authentication module 112a, voice based authentication database 112b, and/or machine learning engine 112c.

Voice based authentication module 112a may have instructions that direct and/or cause voice based authentication platform 102 to provide improved voice based authentication techniques, as discussed in greater detail below. Voice based authentication database 112b may store information used by voice based authentication module 112a and/or voice based authentication platform 102 in application of advanced techniques to provide improved voice based authentication services, and/or in performing other functions. Machine learning engine 112c may train, host, and/or otherwise refine one or more models that may be used to perform voice authentication and/or other functions.

Figure 2A:
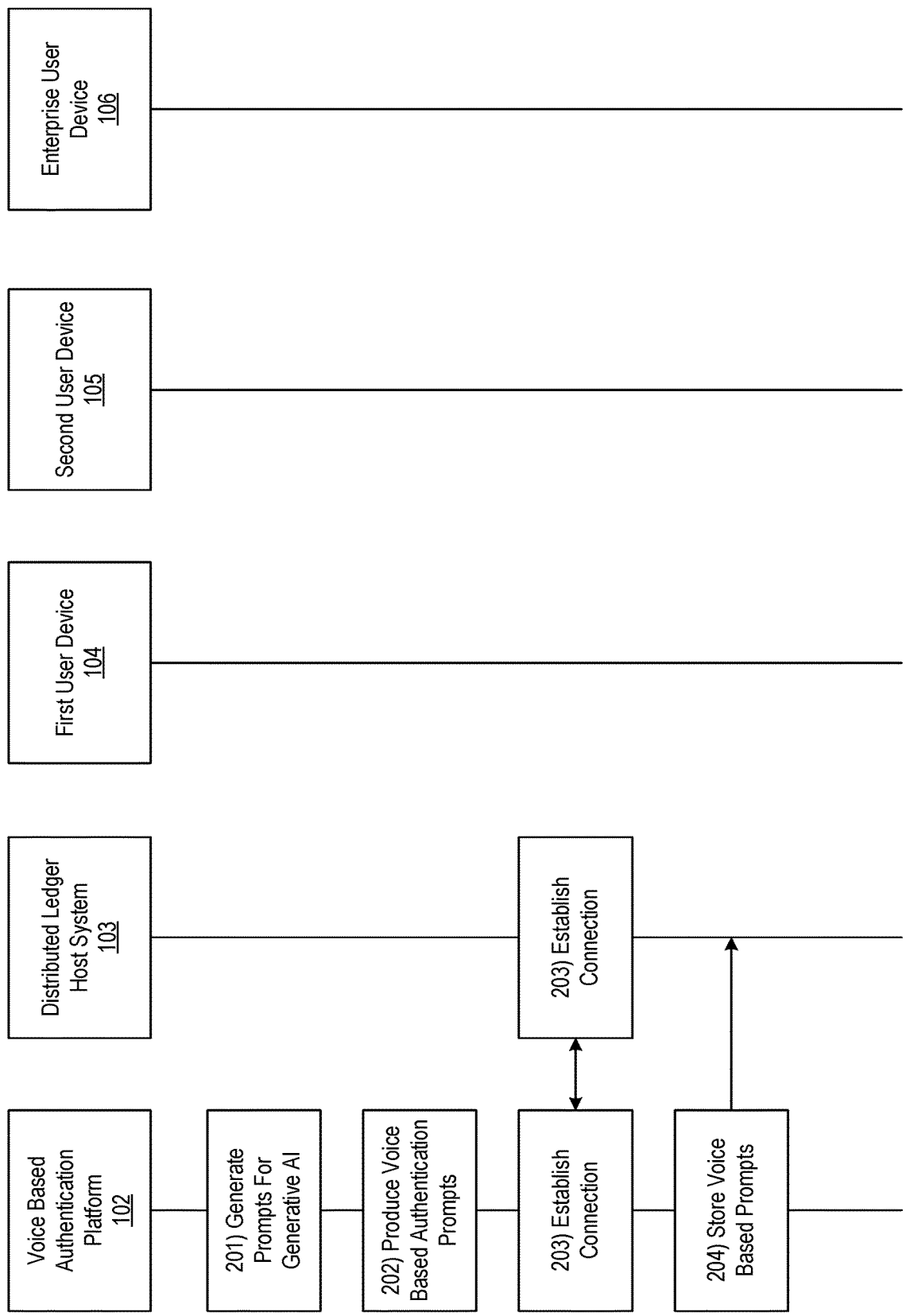

FIGS. 2A-2F depict an illustrative event sequence for leveraging artificial intelligence and distributed ledger technology to prevent deep fake attacks during voice authentication in accordance with one or more example embodiments. Referring to FIG. 2A, at step 201, the voice based authentication platform 102 may generate a prompt for a generative AI model. For example, the voice based authentication platform 102 may generate a prompt, on behalf of a particular individual (who may, e.g., be a customer of an enterprise organization or the like corresponding to the voice based authentication platform 102). For example, the voice based authentication platform 102 may generate a prompt such as "Please generate questions to ask 'individual #1' to validate their identity." In some instances, the voice based authentication platform 102 may generate more tailored prompts based on known information corresponding to the individual (e.g., "Please generate questions associated with recent transactions of 'individual #1'" or the like).

At step 202, the voice based authentication platform 102 may input the prompt, generated at step 201, into a generative AI model (e.g., such as a large language model, or the like). In some instances, the voice based authentication platform 102 may use the generative AI model to output authentication questions for the individual based on known information for the individual (e.g., known transaction information, account information, personal information, credit history information, user profile information, geolocation, spend history, and/or other information). For example, the generative AI model may output voice based authentication prompts, which may, e.g., be textual sentences or the like in a natural language format, and which may be answered by the individual to authenticate their identity.

At step 203, the voice based authentication platform may establish a connection with the distributed ledger host system 103. For example, the voice based authentication platform 102 may establish a first wireless data connection with the distributed ledger host system 103 to link the voice based authentication platform 102 to the distributed ledger host system 103 (e.g., in preparation for storing to and/or otherwise accessing the ledger). In some instances, the voice based authentication platform 102 may identify whether or not a connection is already established with the distributed ledger host system 103. If a connection is already established with the voice based authentication platform 102, the voice based authentication platform 102 might not re-establish the connection. Otherwise, if a connection is not yet established with the voice based authentication platform 102, the voice based authentication platform 102 may establish the first wireless data connection as described herein.

At step 204, the voice based authentication platform 102 may store the voice based authentication prompts, generated at step 202, to a distributed ledger hosted at the distributed ledger host system 103. For example, the voice based authentication platform 102 may communicate with the distributed ledger host system 103 via the communication interface 113 and while the first wireless data connection is established. In some instances, the distributed ledger host system 103 may store the voice based authentication prompts in a single entry of the distributed ledger (e.g., by adding a new entry to an existing ledger, creating a new chain on the ledger, or the like). In some instances, the distributed ledger host system 103 may store this information in a non-fungible token (NFT). In these instances, the distributed ledger host system 103 may activate flags (e.g., Boolean flags, or the like) for the voice based authentication prompts, which may enable use of the corresponding voice based authentication prompts for authentication purposes. Although steps 201-204 are illustrated as being performed prior to receiving the registration request at step 206, they may, in some instances, be performed once the registration and/or another enrollment request has already been received without departing from the scope of the disclosure.

Figure 2B:
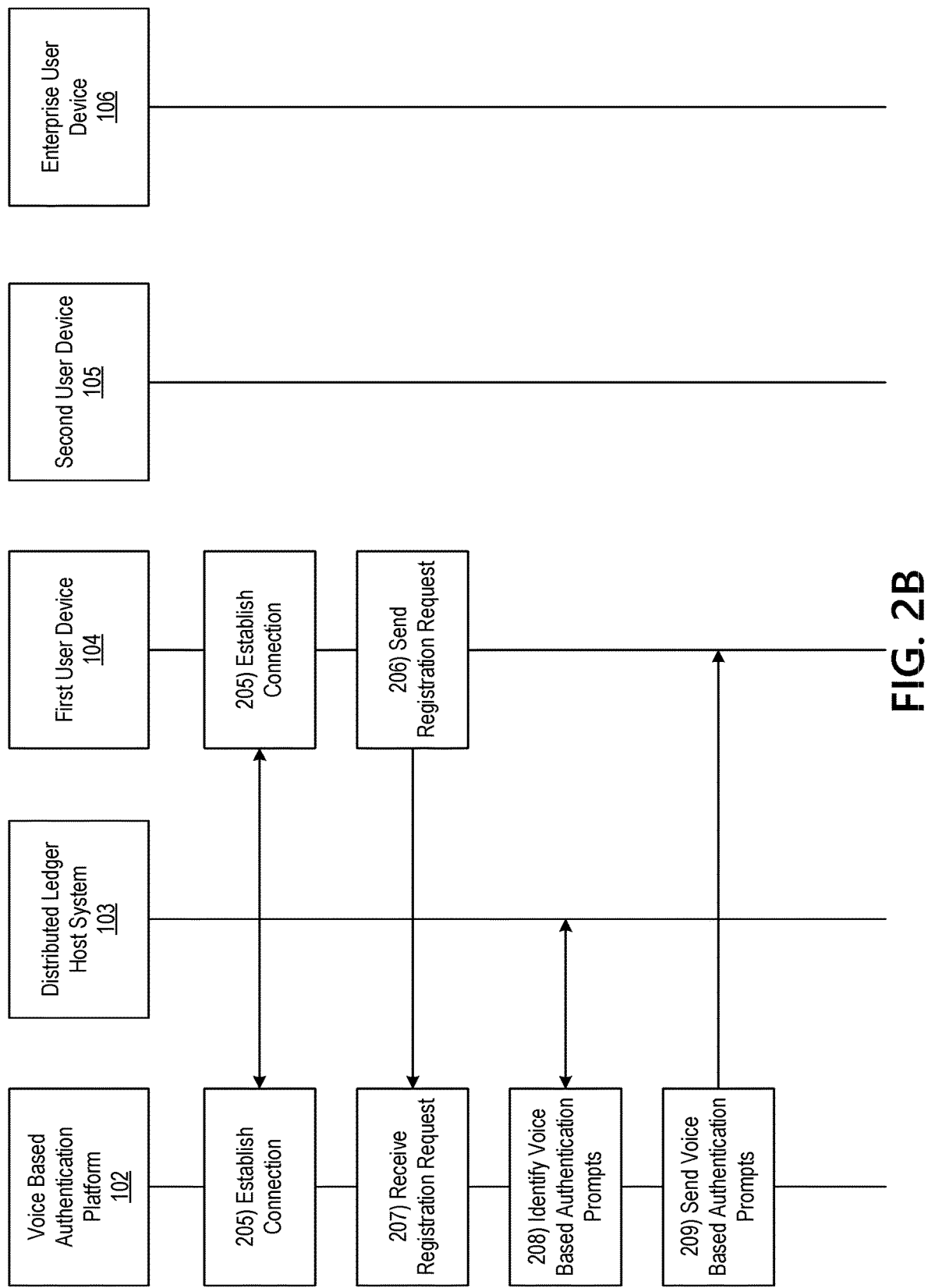

Referring to FIG. 2B, at step 205, the first user device 104 may establish a connection with the voice based authentication platform 102. For example, the first user device 104 may establish a second wireless data connection with the voice based authentication platform 102 to link the first user device 104 to the voice based authentication platform 102 (e.g., in preparation for communicating with the voice based authentication platform 102). In some instances, the first user device 104 may identify whether or not a connection is already established with the voice based authentication platform 102. If a connection is not yet established with the voice based authentication platform 102, the first user device 104 may establish the second wireless data connection as described herein. Otherwise, if a connection is already established with the voice based authentication platform 102, the first user device 104 might not re-establish the connection.

At step 206, the first user device 104 may send a registration request and/or otherwise enroll with a service or application corresponding to the voice based authentication platform 102 (e.g., a mobile banking application, or the like). In some instances, the first user device 104 may send the registration request to the voice based authentication platform 102 while the second wireless data connection is established.

At step 207, the voice based authentication platform 102 may receive the registration request sent at step 206. For example, the voice based authentication platform 102 may receive the registration request via the communication interface 113 and while the second wireless data connection is established.

At step 208, the voice based authentication platform 102 may access the distributed ledger host system 103 to identify voice based authentication prompts corresponding to the individual associated with the first user device 104. For example, the voice based authentication platform 102 may identify entries in the distributed ledger with voice based authentication prompts with active flags.

At step 209, the voice based authentication platform 102 may send the identified voice based authentication prompts to the first user device 104. In some instances, the voice based authentication platform 102 may send the identified voice based authentication prompts to the first user device 104 via the communication interface 113 and while the second wireless data connection is established. In some instances, the voice based authentication platform 102 may also send one or more commands directing the first user device 104 to display the voice based authentication prompts, which may, e.g., cause the first user device 104 to display the voice based authentication prompts (e.g., using an interface similar to graphical user interface 405, which is illustrated in FIG. 4) and prompt the user to provide a voice based audio response to the questions. For example, first user device 104 may prompt with "what is your birthday?" and the individual may respond with the answer. For example, a microphone at the first user device 104 may activate a microphone upon receiving selection of the corresponding prompt. In some instances, the first user device 104 may prompt the individual to provide the answer in multiple pitches (e.g., low, medium, and high, or the like). In some instances, the first user device 104 may prompt for a numerical code format of a response (e.g., month/day/year format, or the like).

Figure 2C:
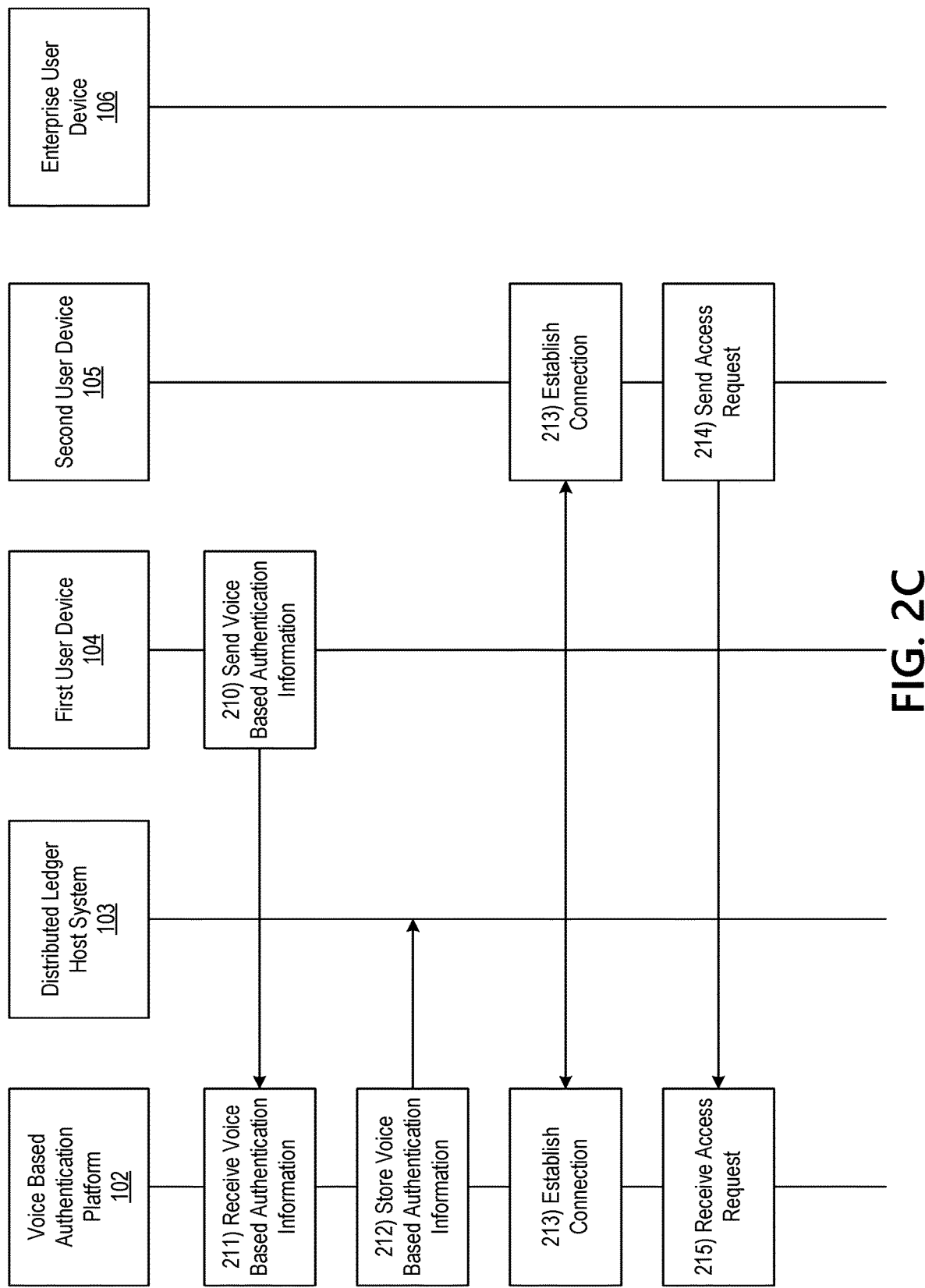

Referring to FIG. 2C, at step 210, the first user device 104 may send voice based authentication information (e.g., audio responses to the voice based authentication prompts) to the voice based authentication platform 102. For example, the first user device 104 may collect the responses and may send them to the voice based authentication platform 102 while the second wireless data connection is established.

At step 211, the voice based authentication platform 102 may receive the voice based authentication information sent at step 210. For example, the voice based authentication platform 102 may receive the voice based authentication information while the second wireless data connection is established and via the communication interface 113.

At step 212, the voice based authentication platform 102 may store the voice based authentication information to the distributed ledger (e.g., by communicating with the distributed ledger host system 103). For example, the voice based authentication platform 102 may store voice based responses to the authentication questions, which may, e.g., be used to validate future responses from the individual. In some instances, the distributed ledger host system 103 may store the responses in the ledger along with the corresponding questions (e.g., modify the corresponding ledger entry to include a question/response pair).

At step 213, the second user device 105 may establish a connection with the voice based authentication platform 102. For example, the second user device 105 may establish a third wireless data connection with the voice based authentication platform 102 to link the second user device 105 with the voice based authentication platform 102 (e.g., in preparation for requesting access to an application or service corresponding to the voice based authentication platform 102, for which the registration request was received at step 206). In some instances, the second user device 105 may identify whether or not a connection is already established with the voice based authentication platform 102. If a connection is already established with the voice based authentication platform 102, the second user device 105 might not re-establish the connection. Otherwise, if the connection is not yet established with the voice based authentication platform 102, the second user device 105 may establish the third wireless data connection as described herein.

At step 214, the second user device 105 may send an access request to the voice based authentication platform 102. For example, the second user device 105 may send the access request via the communication interface 113 and while the third wireless data connection is established. In some instances, the access request may be sent by a legitimate user (e.g., the individual who provided the voice based authentication information at step 210). In these instances, the subsequent steps depicted as being performed at the second user device 105 may be performed at the first user device 104 without departing from the scope of the disclosure. In other instances, the access request may be sent by a bad actor (e.g., who may be trying to access the account of the legitimate individual).

At step 215, the voice based authentication platform 102 may receive the access request sent at step 214. For example, the voice based authentication platform 102 may receive the access request while the third wireless data connection is established and via the communication interface 113.

Figure 2D:
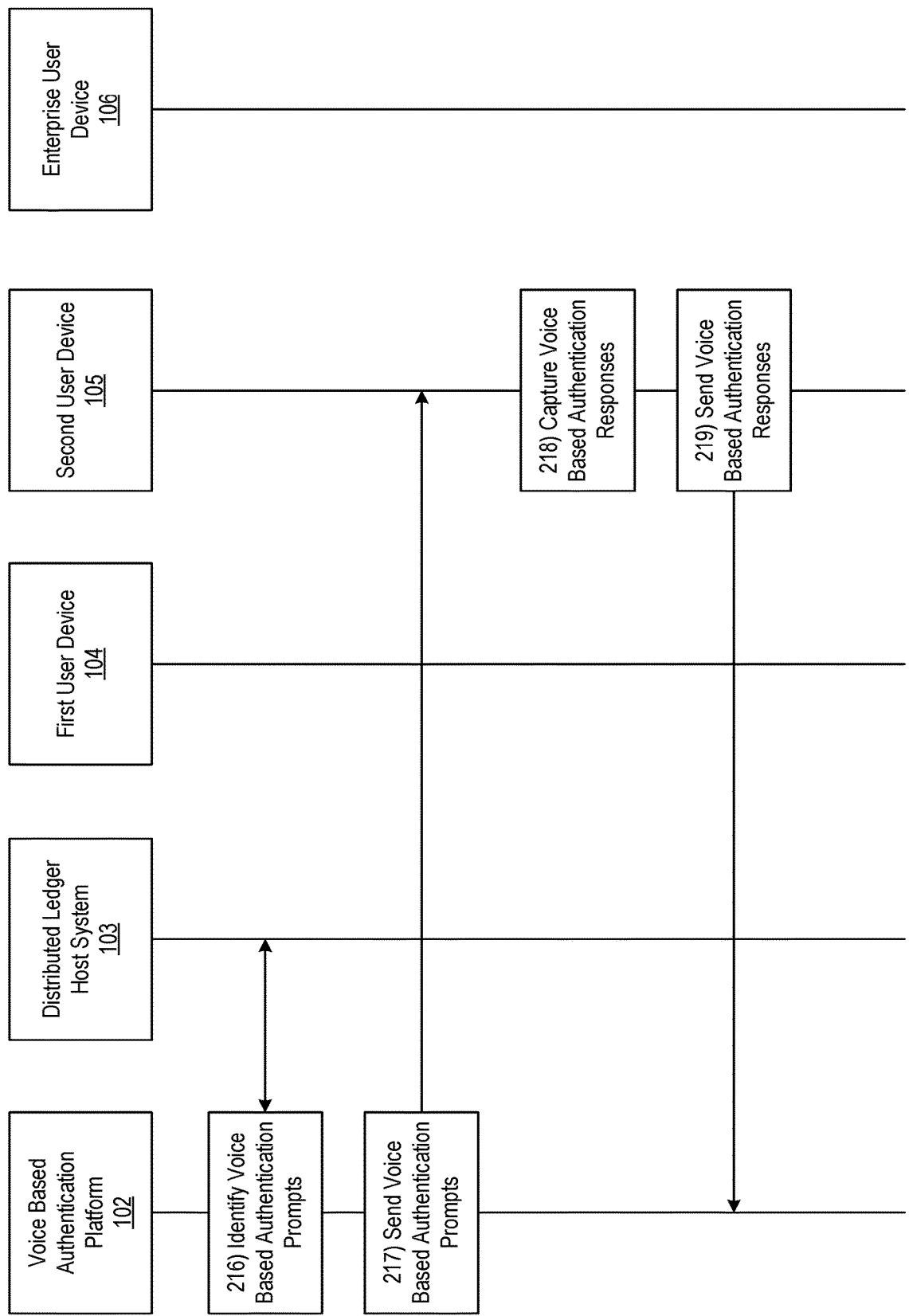

Referring to FIG. 2D, at step 216, the voice based authentication platform 102 may access the distributed ledger host system 103 to identify voice based authentication prompts corresponding to the requested account. For example, the voice based authentication platform 102 may access the entries of the ledger corresponding to the account, and may identify which of the voice based authentication prompts are associated with active flags.

For example, the voice based authentication prompts may be periodically (e.g., at a predetermined interval, or the like), be updated as new outputs are produced by the generative AI model, and updated responses may be obtained from the individual accordingly. This information may be stored in a new entry of the ledger, and the corresponding voice based authentication prompts may be tagged with an active flag. Similarly, the flags for outdated voice based authentication prompts may be deactivated. This may allow the ledger to be maintained (without deleting information from the ledger), while still allowing for updated security information. Doing so may improve security of corresponding accounts by consistently changing the voice based authentication prompts, which may, e.g., prevent bots and/or other automated services from hacking the responses, and/or may account for changes in an individual's voice over time. In some instances, the distributed ledger host platform 103 may toggle the flags on/off for various voice based authentication prompts based on the effectiveness of the corresponding questions in validating a user identity. Similarly, the order in which the questions are presented may be changed with each communication and/or on a periodic basis.

At step 217, the voice based authentication platform 102 may send the voice based authentication prompts to the second user device 105. For example, the voice based authentication platform 102 may send the voice based authentication prompts to the second user device 105 via the third wireless data connection and via the communication interface 113. In some instances, actions performed at step 217 may be similar to those performed and described above at step 209.

At step 218, the second user device 105 may capture voice based authentication responses. For example, the second user device 105 may prompt for voice responses to questions presented at the second user device.

At step 219, the second user device 105 may send the voice based authentication responses to the voice based authentication platform 102 (e.g., while the third wireless data connection is established). In some instances, actions performed at step 218 may be similar to those described above at step 210.

Figure 2E:
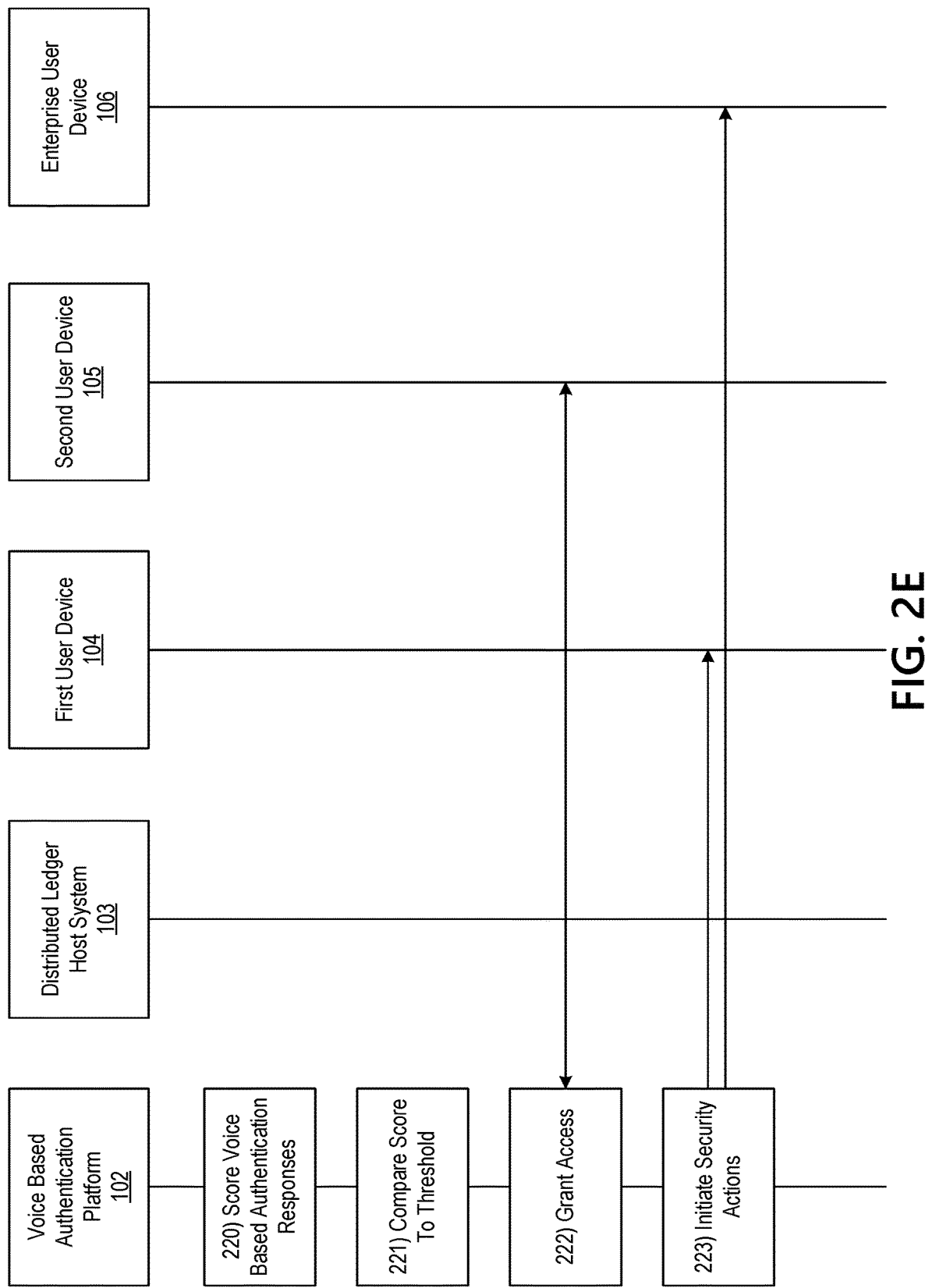

Referring to FIG. 2E, at step 220, the voice based authentication platform 102 may input the voice based authentication responses received at step 219 into a scoring model. In some instances, the scoring model may be a machine learning model. For example, the voice based authentication platform 102 may have previously trained the scoring model to produce authentication scores based on a comparison of the voice based authentication responses to the stored voice based authentication information, both in terms of the speech pattern and accuracy of the response (e.g., based on content of response). For example, voice based authentication platform 102 may have received historical natural language and/or other speech pattern information (e.g., tone, utterances, speed, pace, and/or other information). The voice based authentication platform 102 may input the historical speech pattern information (which may, e.g., be labelled with speech comparison scores indicating how closely the corresponding speech patterns matched validated speech pattern information for a corresponding individual) into the scoring model to train the scoring model to identify speech scores for audio inputs based on their comparisons against a known valid pattern for the corresponding individual. In doing so, the voice based authentication platform 102 may train the scoring model to output, for a given speech input, a score representative of its authenticity.

In some instances in training the scoring model, the voice based authentication platform 102 may also train the scoring model based on response accuracy. For example, whether or not a response to a prompt matches the substance of the known true answer (e.g., was the correct birthday provided, or the like). In some instances, the response may be further validated against user records, a transaction history, or the like. In some instances, the scoring model may be trained to identify exact and/or non-exact (but acceptable) matches, and score a request accordingly. For example, the scoring model may be trained to produce an accuracy score that represents a percentage of the questions that were accurately answered (e.g., 75% if three of four questions were correctly answered, or the like). The scoring model may be further trained to produce an overall score by weighting the speech and accuracy scores (e.g., 50/50, or a different weighting).

In some instances, in training the scoring model, the voice based authentication platform 102 may train a supervised learning model (e.g., decision tree, bagging, boosting, random forest, neural network, linear regression, artificial neural network, support vector machine, deep reinforcement learning model, and/or other supervised learning model), unsupervised learning model (e.g., classification, clustering, anomaly detection, feature engineering, feature learning, and/or other unsupervised learning models), and/or other model.

Once trained, the voice based authentication platform 102 may input the voice based authentication responses into the scoring model along with the voice based authentication information, and may produce a score accordingly. For example, the voice based authentication platform 102 may identify how closely a speech pattern and the accuracy of the corresponding responses match known responses, and produce a score representative of the comparison accordingly.

At step 221, the voice based authentication platform 102 may compare the score (produced at step 220) to a predetermined threshold (e.g., 80% or the like). In instances where the voice based authentication platform 102 identifies that the predetermined threshold is met or exceeded, it may proceed to step 222. Otherwise, if the predetermined threshold is not met or exceeded, the voice based authentication platform 102 may proceed to step 223.

Although described as a single score compared to a single threshold, the voice based authentication platform 102 may, in some instances, compare the accuracy score first to an accuracy score threshold, and then proceed to compare the speech score to a second threshold only where the accuracy score threshold is met or exceeded. Then, if both thresholds are met or exceeded, the voice based authentication platform 102 may proceed to step 222. Otherwise, the voice based authentication platform 102 may proceed to step 223.

At step 222, the voice based authentication platform 102 may grant the individual access to the requested application, information, or the like. In these instances, the voice based authentication platform 102 may cause display of an application interface at the second user device 105 (which may, e.g., be similar to the graphical user interface 505, which is shown in FIG. 5). The voice based authentication platform 102 may then proceed to step 224.

Figure 6:
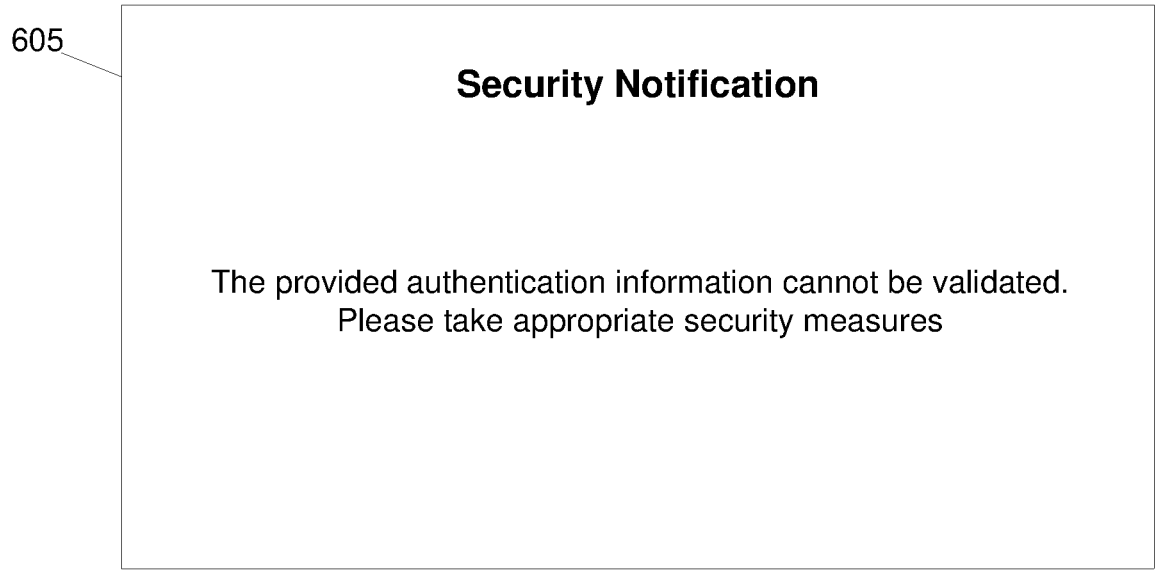

At step 223, the voice based authentication platform 102 may perform one or more security actions (e.g., notify a legitimate account holder at the first user device 104, notify an enterprise administrator or other employee at the enterprise user device 106 (e.g., as shown in graphical user interface 605, as depicted in FIG. 6), prevent application access to the second user device 105, and/or perform other security actions).

Referring to FIG. 2F, at step 224, the voice based authentication platform 102 may update the scoring model based on the voice based authentication responses, the score, and/or other information. In doing so, the voice based authentication platform 102 may continue to refine the scoring model using a dynamic feedback loop, which may, e.g., increase the accuracy and effectiveness of the model in performing identify verification and/or performing other functions.

For example, the voice based authentication platform 102 may use the score, voice based authentication responses, and/or other information to reinforce, modify, and/or otherwise update the scoring model, thus causing the model to continuously improve (e.g., in terms of authentication).

In some instances, the voice based authentication platform 102 may continuously refine the scoring model. In some instances, the voice based authentication platform 102 may maintain an accuracy threshold for the scoring model, and may pause refinement (through the dynamic feedback loops) of the model if the corresponding accuracy is identified as greater than the corresponding accuracy threshold. Similarly, if the accuracy fails to be equal or less than the given accuracy threshold, the voice based authentication platform 102 may resume refinement of the model through the corresponding dynamic feedback loop.

Figure 3:
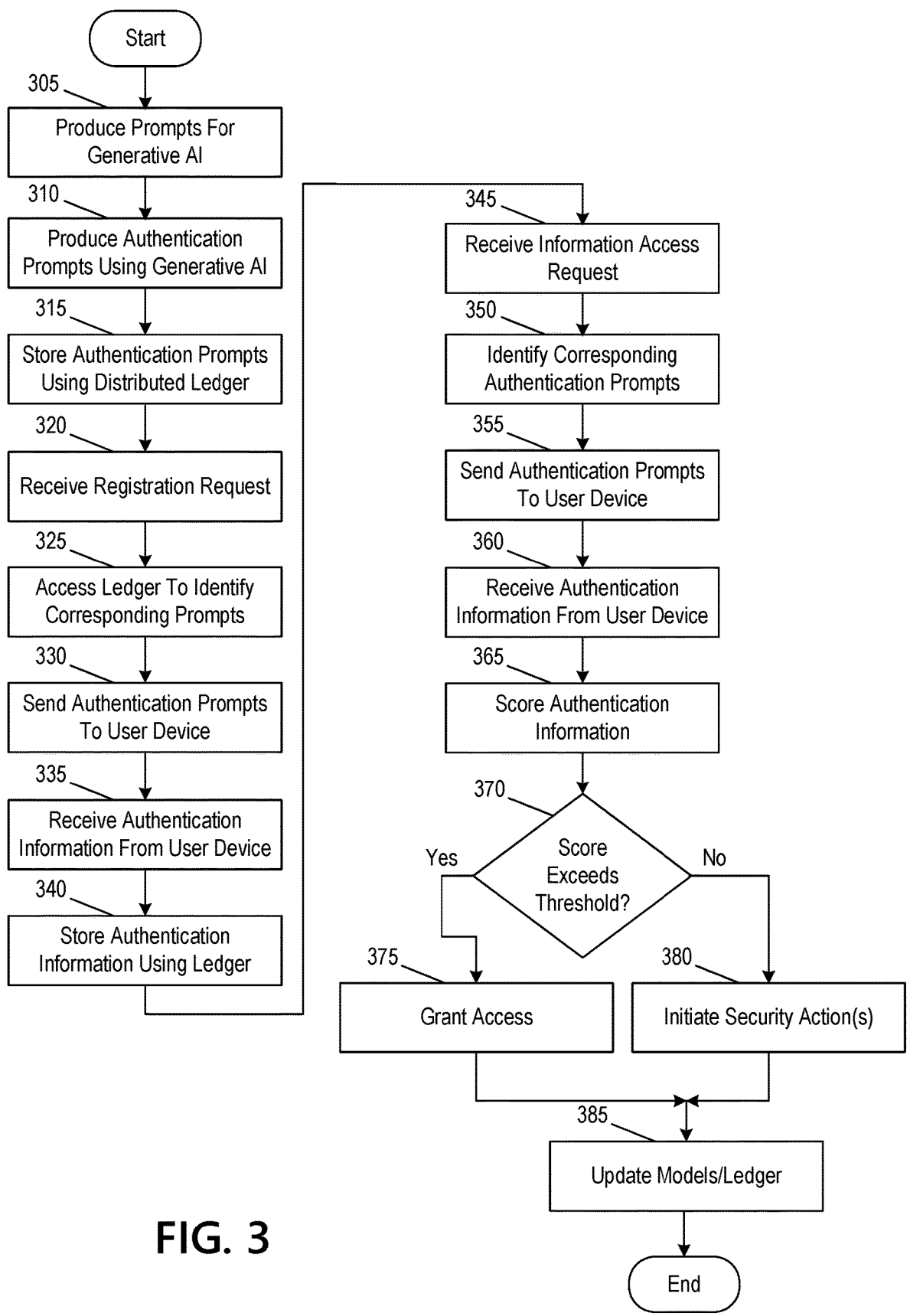
FIG. 3 depicts an illustrative method for leveraging artificial intelligence and distributed ledger technology to prevent deep fake attacks during voice authentication in accordance with one or more example embodiments.

FIG. 3 depicts an illustrative method for leveraging artificial intelligence and distributed ledger technology to prevent deep fake attacks during voice authentication in accordance with one or more example embodiments. At step 305, a computing platform having at least one processor, a communication interface, and memory may produce prompts for a generative AI model. At step 310, the computing platform may produce the authentication prompts using the generative AI model. At step 315, the computing platform may store the authentication prompts using a distributed ledger. At step 320, the computing platform may receive a registration request from a user device. At step 325, the computing platform may access the distributed ledger to identify corresponding authentication prompts. At step 330, the computing platform may send the authentication prompts to the user device. At step 335, the computing platform may receive authentication information from the user device. At step 340, the computing platform may store the authentication information using the distributed ledger. At step 345, the computing platform may receive an information access request. At step 350, the computing platform may identify corresponding authentication prompts for the requested account. At step 355, the computing platform may send the authentication prompts to the requesting user device. At step 360, the computing platform may receive authentication information from the requesting user device. At step 365, the computing platform may score the authentication information. At step 370, the computing platform may identify whether or not the score exceeds a predetermined threshold. If the score does exceed the threshold, the computing platform may proceed to step 375. Otherwise, if the score does not exceed the threshold, the computing platform may proceed to step 380.

At step 375, the computing platform may grant account access to the requesting user. At step 385, the computing platform may update the scoring model based on the authentication information and the generated score.

Returning to step 370, if the score did not meet or exceed the threshold, the computing platform may proceed to step 380 to initiate a security action. The computing platform may then update the scoring model as described above at step 385.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   generate, using a generative artificial intelligence (AI) model, a plurality of voice based authentication prompts corresponding to a user;
   upon receiving a registration request from the user, identify the plurality of voice based authentication prompts for the user;
   send, to a first computing device of the user, the plurality of voice based authentication prompts and one or more commands directing the first computing device to display the plurality of voice based authentication prompts along with a request for the user to provide a voice based audio input corresponding to each of the plurality of voice based authentication prompts;
   receive, from the first computing device, voice based authentication information corresponding to the voice based audio inputs;
   store the voice based authentication information;
   receive, from a second computing device, an account access request corresponding to the user;
   send, to the second computing device, the plurality of voice based authentication prompts and one or more commands directing the second computing device to display the plurality of voice based authentication prompts along with a request to provide additional voice based audio inputs corresponding to each of the plurality of voice based authentication prompts;
   receive, from the second computing device, the additional voice based audio inputs;
   score, based on the voice based authentication information, the additional voice based audio inputs;
   compare the score to a predetermined threshold; and
   based on identifying that the score fails to meet or exceed the predetermined threshold, initiate one or more security actions.

2. The computing platform of claim 1, wherein the memory stores additional computer-readable instructions that, when executed by the at least one processor, cause the computing platform to:
   generate, on behalf of the user, a prompt configured for input into the generative AI model, wherein the prompt is generated by inputting information of the user into a trained machine learning model.

3. The computing platform of claim 1, wherein generating the plurality of voice based authentication prompts comprises:
   inputting, into the generative AI model, a prompt, wherein inputting the prompt into the generative AI model causes the generative AI model to output the plurality of voice based authentication prompts for the user.

4. The computing platform of claim 1, wherein each of the plurality of voice based authentication prompts comprises text formatted in a natural language format, and wherein the text indicates a question to be answered with a speech response.

5. The computing platform of claim 1, wherein the memory stores additional computer-readable instructions that, when executed by the at least one processor, cause the computing platform to:
   store, at a distributed ledger, the plurality of voice based authentication prompts, wherein identifying the plurality of voice based authentication prompts for the user comprises identifying, by accessing the distributed ledger, the plurality of voice based authentication prompts.

6. The computing platform of claim 5, wherein the memory stores additional computer-readable instructions that, when executed by the at least one processor, cause the computing platform to:
   update, at a predetermined interval, the plurality of voice based authentication prompts corresponding to the user to produce an updated set of voice based authentication prompts;
   store, by adding a new entry to the distributed ledger, the updated set of voice based authentication prompts;
   deactivate flags corresponding to the plurality of voice based authentication prompts; and
   activate flags corresponding to the updated set of voice based authentication prompts.

7. The computing platform of claim 1, wherein identifying the plurality of voice based authentication prompts for the user comprises identifying voice based authentication prompts at a distributed ledger with active flags.

8. The computing platform of claim 1, wherein storing the voice based authentication information comprises storing the voice based authentication information using a distributed ledger.

9. The computing platform of claim 1, wherein scoring the additional voice based audio inputs comprises:
   inputting, into a machine learning model, the additional voice based audio inputs, wherein the machine learning model is configured to output the score based on both of:
   a similarity between speech patterns of the additional voice based audio inputs and speech patterns of the voice based authentication information, and
   an accuracy of content comprising the additional voice based audio inputs, as compared to content of the voice based authentication information.

10. The computing platform of claim 1, wherein the memory stores additional computer-readable instructions that, when executed by the at least one processor, cause the computing platform to:
    based on identifying that the score fails to meet or exceed the predetermined threshold, granting account access.

11. A method comprising:
    at a computing platform comprising at least one processor, a communication interface, and memory:
    generating, using a generative artificial intelligence (AI) model, a plurality of voice based authentication prompts corresponding to a user;
    upon receiving a registration request from the user, identifying the plurality of voice based authentication prompts for the user;
    sending, to a first computing device of the user, the plurality of voice based authentication prompts and one or more commands directing the first computing device to display the plurality of voice based authentication prompts along with a request for the user to provide a voice based audio input corresponding to each of the plurality of voice based authentication prompts;
    receiving, from the first computing device, voice based authentication information corresponding to the voice based audio inputs;
    storing the voice based authentication information;

receiving, from a second computing device, an account access request corresponding to the user;

sending, to the second computing device, the plurality of voice based authentication prompts and one or more commands directing the second computing device to display the plurality of voice based authentication prompts along with a request to provide additional voice based audio inputs corresponding to each of the plurality of voice based authentication prompts;

receiving, from the second computing device, the additional voice based audio inputs;

scoring, based on the voice based authentication information, the additional voice based audio inputs;

comparing the score to a predetermined threshold; and based on identifying that the score fails to meet or exceed the predetermined threshold, initiating one or more security actions.

12. The method of claim 11, further comprising:
generating, on behalf of the user, a prompt configured for input into the generative AI model, wherein the prompt is generated by inputting information of the user into a trained machine learning model.

13. The method of claim 11, wherein generating the plurality of voice based authentication prompts comprises:
inputting, into the generative AI model, a prompt, wherein inputting the prompt into the generative AI model causes the generative AI model to output the plurality of voice based authentication prompts for the user.

14. The method of claim 11, wherein each of the plurality of voice based authentication prompts comprises text formatted in a natural language format, and wherein the text indicates a question to be answered with a speech response.

15. The method of claim 11, further comprising:
storing, at a distributed ledger, the plurality of voice based authentication prompts, wherein identifying the plurality of voice based authentication prompts for the user comprises identifying, by accessing the distributed ledger, the plurality of voice based authentication prompts.

16. The method of claim 15, further comprising:
updating, at a predetermined interval, the plurality of voice based authentication prompts corresponding to the user to produce an updated set of voice based authentication prompts;
storing, by adding a new entry to the distributed ledger, the updated set of voice based authentication prompts;
deactivating flags corresponding to the plurality of voice based authentication prompts; and
activating flags corresponding to the updated set of voice based authentication prompts.

17. The method of claim 11, wherein identifying the plurality of voice based authentication prompts for the user comprises identifying voice based authentication prompts at a distributed ledger with active flags.

18. The method of claim 11, wherein storing the voice based authentication information comprises storing the voice based authentication information using a distributed ledger.

19. The method of claim 11, wherein scoring the additional voice based audio inputs comprises:
inputting, into a machine learning model, the additional voice based audio inputs, wherein the machine learning model is configured to output the score based on both of:
a similarity between speech patterns of the additional voice based audio inputs and speech patterns of the voice based authentication information, and
an accuracy of content comprising the additional voice based audio inputs, as compared to content of the voice based authentication information.

20. One or more non-transitory computer-readable media storing instructions that, when executed by a computing platform comprising at least one processor, a communication interface, and memory, cause the computing platform to:
generate, using a generative artificial intelligence (AI) model, a plurality of voice based authentication prompts corresponding to a user;
upon receiving a registration request from the user, identify the plurality of voice based authentication prompts for the user;
send, to a first computing device of the user, the plurality of voice based authentication prompts and one or more commands directing the first computing device to display the plurality of voice based authentication prompts along with a request for the user to provide a voice based audio input corresponding to each of the plurality of voice based authentication prompts;
receive, from the first computing device, voice based authentication information corresponding to the voice based audio inputs;
store the voice based authentication information;
receive, from a second computing device, an account access request corresponding to the user;
send, to the second computing device, the plurality of voice based authentication prompts and one or more commands directing the second computing device to display the plurality of voice based authentication prompts along with a request to provide addition al voice based audio inputs corresponding to each of the plurality of voice based authentication prompts;
receive, from the second computing device, the additional voice based audio inputs;
score, based on the voice based authentication information, the additional voice based audio inputs;
compare the score to a predetermined threshold; and
based on identifying that the score fails to meet or exceed the predetermined threshold, initiate one or more security actions.

* * * * *